United States Patent [19]

Erickson

[11] Patent Number: 4,555,197

[45] Date of Patent: Nov. 26, 1985

[54] SELECTIVELY FREE WHEELING OR DRIVE HUB FOR VEHICLES

[76] Inventor: Mervin L. Erickson, 930 Dakota Ave. South, Huron, S. Dak. 57350

[21] Appl. No.: 532,287

[22] Filed: Sep. 15, 1983

[51] Int. Cl.[4] .......................... F16D 1/06; B60B 27/00
[52] U.S. Cl. ..................................... 403/1; 192/67 R; 192/94; 192/95
[58] Field of Search ................... 403/1; 192/67 R, 95, 192/97, 94; 180/233

[56] References Cited

U.S. PATENT DOCUMENTS

| | | | |
|---|---|---|---|
| 1,278,669 | 9/1918 | Jacob | 301/130 |
| 1,410,863 | 3/1922 | Woodson | 301/130 |
| 1,904,371 | 4/1933 | Hynan | |
| 2,609,243 | 9/1952 | Ponnequin | 403/1 |
| 3,251,630 | 5/1966 | Astley | 301/1 |
| 3,282,365 | 11/1966 | McReynolds | 180/27 |
| 4,089,610 | 5/1978 | Kleespies et al. | 403/1 |
| 4,266,646 | 5/1981 | Telford | 192/67 R |
| 4,287,972 | 9/1981 | Petrak | 403/1 |
| 4,327,821 | 3/1982 | Telford | 403/1 |
| 4,337,003 | 6/1982 | Juhl | 403/1 |

Primary Examiner—Cornelius J. Husar
Assistant Examiner—Todd G. Williams
Attorney, Agent, or Firm—Kinney & Lange

[57] ABSTRACT

A hub comprising a self contained unit that can be placed onto the drive axles of a vehicle that is to be towed periodically, and used to provide for free wheeling of the wheel mounted on the hub or, alternately driving from the vehicle drive axle to the hub when the vehicle is to be driven.

5 Claims, 4 Drawing Figures

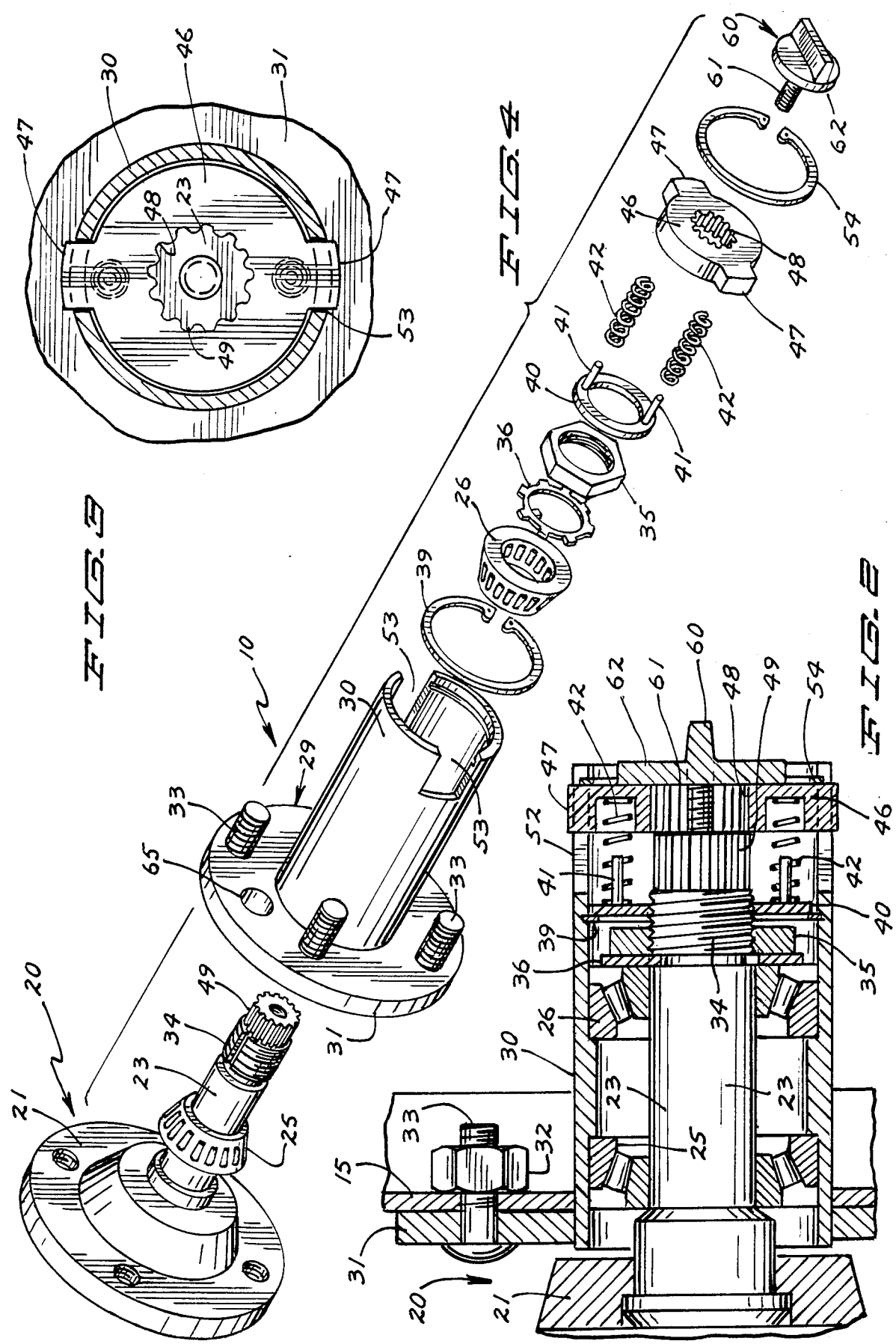

SELECTIVELY FREE WHEELING OR DRIVE HUB FOR VEHICLES

BACKGROUND OF THE INVENTION

1. Field of the Invention

The present invention relates to a free wheeling adapter for permitting towing automotive vehicles without damage to the transmission and selectively to permit driving the vehicle.

2. Description of the Prior Art

Various selectively drive and/or free wheeling hub devices for use with automotive vehicles have been advanced. These devices are generally useful, but improvements in the mechanism for permitting driving the vehicle, and quickly releasing a hub for free wheeling still is a need. Further, the devices have to be easily attached to the existing wheel supports for the vehicle and cannot have excessive overhang on the axles, and thus must be compact in design, foolproof, and easily made for low cost.

U.S. Pat. No. 4,337,003, issued to Juhl on June 29, 1982 illustrates a selectively lockable or free wheeling device that is insertable between a vehicle wheel and its axle, and which includes a backing plate that mounts onto the wheel bolts of the vehicle. The backing plate carries a stub shaft or axle that is used for mounting a hub having a bolt circle identical to that of the wheel for the vehicle on which it is used so that the vehicle wheel can be mounted on the hub. The hub is normally free wheeling, but can be drivably coupled to the backing plate by the use of bolts that pass through the wheel bolt openings and thread into the main support flange to effect a drive connection. This increases the difficulty of changing from a free wheeling system to a drive system when the vehicle is going to be driven, and increases the cost. Additionally, the provision of two separate wheel bolts is necessary, having different lengths, and if by accident one of the long bolts was used when free wheeling was desired, damage could result when the vehicle was towed or driven.

U.S. Pat. No. 4,266,646 illustrates a wheel hub that has a disengagable clutch or drive arrangement for free wheeling, and is designed to provide for a drive between a "live" vehicle axle and a hub. The drive is directly between the vehicle axle and the hub. It does use a spline arrangement for driving which can be engaged and disengaged. However, it does not provide for a rapid connection to an existing automotive type wheel mounting which has a free wheeling hub in place on it.

U.S. Pat. No. 4,089,610 illustrates a wheel hub that involves external clutching mechanisms that, while useful, require special adapters for the end of the vehicle driving hub and for connecting to the free wheeling hub.

Supplemental axles or emergency stub axles are shown in U.S. Pat. Nos. 1,410,863 and 1,278,669. These show devices for mounting wheels on axles other than the primary axle provided on the vehicle, but do not show the free wheeling concept.

U.S. Pat. No. 3,251,630 shows a vehicle wheel assembly for a golf cart to permit towing such a golf cart without turning the differential or transmission by having a drive from the normally mounted wheel to the axle that can be released or disengaged.

U.S. Pat. No. 1,904,371 shows a demountable wheel lock that can be used for quick removal of the wheel, but does not show a free wheeling concept.

Thus the art fails to show an easily used, readily made and conveniently attached hub that can be used for either drive or free wheeling operation such as that shown in the present device.

SUMMARY OF THE INVENTION

The present invention relates to a hub assembly that includes a first member and a second member that can be selectively made to be free wheeling relative to each other or in driving relationship. The first member is adapted to be mounted on the wheel bolts on the driving axle of a vehicle, and it has a stub axle on which the second member or hub is rotatably mounted. The second member or hub is used for mounting the wheel, and by selectively engaging or disengaging a drive coupling between the stub axle and the second member or hub, the wheel can be made free wheeling for towing the vehicle, or can be put into driving engagement when the vehicle is to be driven.

The hub assembly is easily used and more over is quite easily observed from the exterior to see if it is in a driving or free wheeling arrangement. Yet the hub provides positive positioning of the drive members for either engagement or disengagement so that there is no fear of damaging any members during operation or use.

The unit is easily manufactured, and is easily installed and used. Further, the changing from drive to free wheeling is easily accomplished.

BRIEF DESCRIPTION OF THE DRAWINGS

FIG. 2 is a fragmentary enlarged sectional view of a bearing arrangement of the assembly of FIG. 1 with the unit in free wheeling position;

FIG. 3 is a sectional view taken as on line 3—3 in FIG. 1; and

FIG. 4 is an exploded view of the hub assembly made according to the present invention.

DETAILED DESCRIPTION OF THE PREFERRED EMBODIMENT

Figure 1:
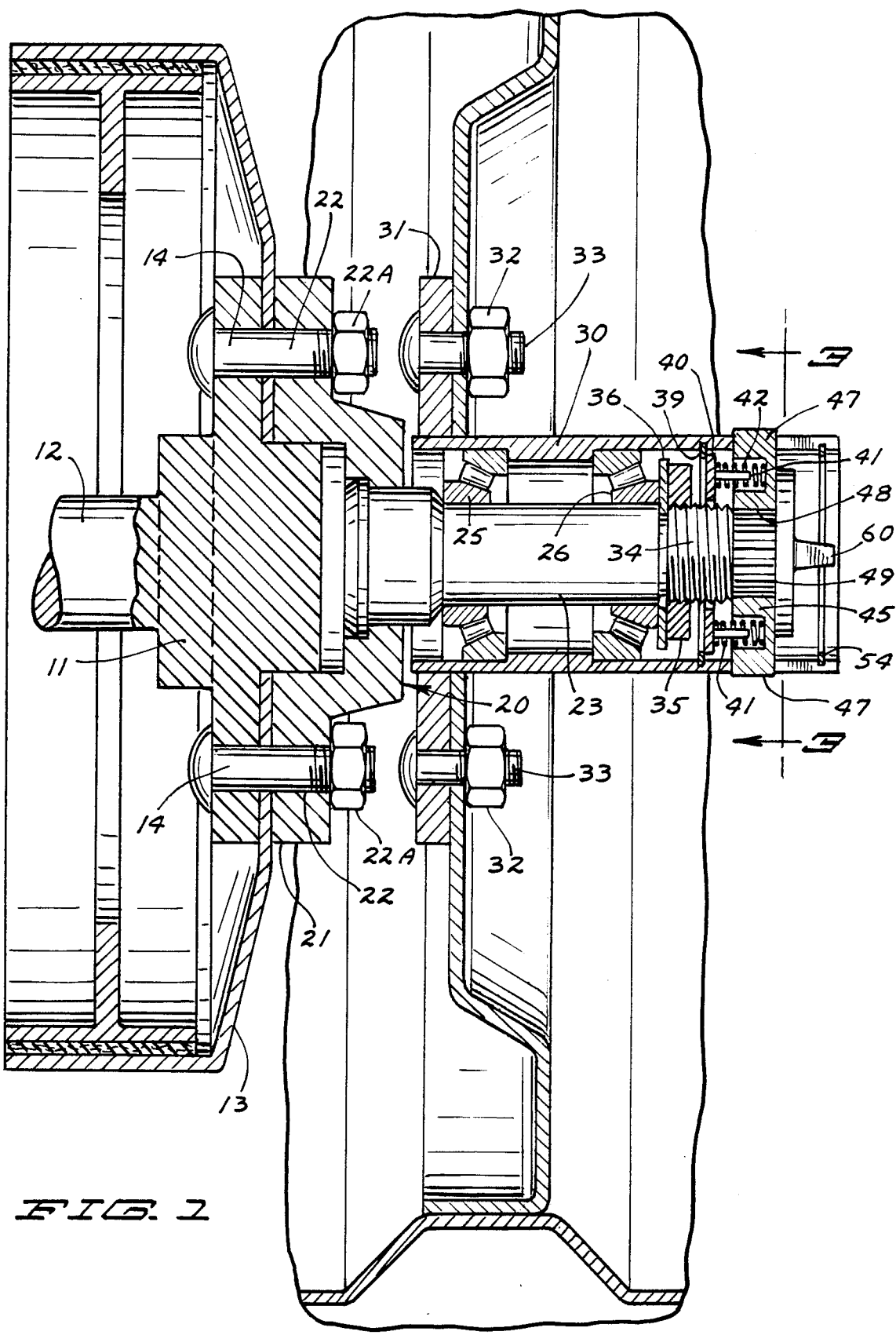
FIG. 1 is a vertical sectional view taken through a typical vehicle wheel hub, showing an assembly made according to the present invention installed therein.

The free wheeling hub assembly indicated generally at 10 is adapted to be connected to the wheel mounting flange 11 connected to a drive axle 12 of an automotive vehicle. The flange 11 has a brake drum 13 mounted thereon, and normally the flange 11 includes wheel bolts 14 that are used for attaching a vehicle wheel to the flange 11 in a normal manner. On small vehicles four bolt wheels are quite common at the present time.

The hub assembly indicated at 10 is used for providing a free wheeling connection from the flange 11 to a vehicle wheel indicated generally at 15, and to selectively permit a driving connection from flange 11 to the wheel 15.

The free wheeling hub assembly 10 includes a first stub axle assembly 20 including a mounting flange 21 that has bolt openings indicated at 22 to receive the wheel bolts 14, and as shown is capable of being attached thereto with lug nuts indicated at 22A. The stub axle assembly 20 includes a stub axle shaft 23 that is fixed to the mounting flange 21 in a suitable manner. The axle can be integrally machined with the flange, or welded to the axle. The stub axle is selected in length to permit supporting a pair of bearings 25, and 26.

An outer sleeve 30 also has a wheel support flange 31 fixed at one end thereof to form a free wheeling hub assembly 29. The hub sleeve is mounted on the bearings 25 and 26 for rotational movement relative to the stub axle 23. The wheel 15 as shown is mounted on the wheel flange 31 and held in place with suitable lug nuts 32 mounted on bolts 33 that are attached to the wheel flange 31. Thus with the sleeve 30 installed with only the parts described so far, the wheel 15 is able to rotate relative to the flange 11 on the bearings 25 and 26.

The outer end of the stub axle 23 is threaded as shown at 34, and the threads in turn mount a bearing adjustment nut 35 that can be held in place with a locking washer 36 after the bearings 25 and 26 have been adjusted by use of the nut. The nut 35 holds the outer bearing in place on the axle. The outer races of the bearings are held in place in the hub 30. A snap ring 39 is mounted on the interior of the sleeve 30 and spring support washer 40 slips over the threaded portion of the stub axle 23 and fits closely on the interior surface of the hub sleeve 30 and abuts against the snap ring. The washer 40 is spaced axially from the nut 35 and the interior surfaces of the sleeve 30 keep the washer centered in the sleeve 30. The snap ring and washer rotate with the sleeve 30.

The washer 40 has a pair of support pegs 41 that are fixedly mounted thereon and face outwardly from the washer surface.

The spring support pegs 41 each have a coil spring 42 mounted thereon and extending in axial direction of the stub axle 23, and the springs in turn fit into receptacles on the inner face of a drive lug member 45. The lug member 45 is similar to a heavy washer, having a central portion 46 and a pair of opposed ears 47,47. An interior opening of the central portion 46 has an inner surface which is splined as shown at 48, and the spline 48 fits over an exterior spline shaped section 49 on the stub axle 23 near its outer end.

The ears 47,47 slidably fit within grooves or slots indicated at 53 defined in the outer end portions of the sleeve 30.

A snap ring 54 is provided on the interior of the sleeve 30 to the outside surface of the lug 45 to prevent excessive movement of the drive lug 45 outwardly from the hub sleeve 30 subsequent to assembly.

The axial position of the drive lug 45 relative to the stub axle 23 is controlled by actuator cap screw 60 which has a shank 61 that is threaded into a provided opening along the central axis of the stub axle 23. The cap screw 60 has a head or flange 62 that is of size to bear against the center portion 46 of the drive lug 45. The cap screw resists the resilient force of the springs 42 which tend to move the drive lug 45 outwardly (away from flange 21) from the end of the stub axle 23. The ears 47 on the drive lug 45 slide in the slots 53 of hub sleeve 30 and move easily under the urging of the springs 42 when the cap screw 60 is threaded outwardly so that the flange 62 permits the drive lug to be pushed axially by the springs. This will permit the interior spline 48 of the drive lug 45 to clear the spline 49 on the stub axle so that there is no driving engagement between the stub axle 23 and the drive lug. This is the free wheeling position as shown in FIG. 2 so that the hub sleeve 30 then freely rotates relative to the stub axle 23, and the wheel 15 can then turn easily on bearings 25 and 26 if the vehicle is being towed.

By threading the cap screw 60 inwardly (toward the flange 21), so that the flange 60 pushes the drive lug 45 inwardly and the interior spline 48 will mate with the exterior spline 49 on the stub axle 23 and a drive will be effected through the matings spline surfaces, and through the lugs 47 driving against the edges of the slots 53 to provide a drive connection to the hub sleeve 30. The vehicle then can be driven in a normal manner.

The positions of the drive connectors are positively determined by the spring pressure from springs 42 and by the cap screw 60, and there is no likelihood of any accidental engagement or disengagement during use. The snap ring 54 will keep the drive lug from moving completely out of the hub sleeve.

If desired a grease zerk can be provided through the wall of the hub sleeve 30 to insure that the interior bearings, and any thrust load between the washer 40 and the nut 36 during free wheeling will be carried under lubrication.

In order to attach the flange 21 onto the existing wheel bolts 14, an aperture indicated at 65 is provided in the wheel flange 31, between two of the lug bolts 33. This aperture or opening 65 is on the same bolt circle as the bolts 14 and is of size so that a normal wrench holding a wheel lug nut 22 can be passed through the aperture 65. In this way the lug nuts can be tightened through aperture 65 without the need for cutaway portions of the flange 31.

The unit is thus easily installed on existing automobiles and also easily removed if desired. The attachment to the flange 11 will be made without the wheel 15 in place on the flange 31 so that the area is open for operation.

Although the present invention has been described with reference to preferred embodiments, workers skilled in the art will recognize that changes may be made in form and detail without departing from the spirit and scope of the invention.

What is claimed is:

1. A free wheeling hub adapter for connection between the drive axle of a vehicle and a wheel comprising:
   a stub axle having a mounting flange, said mounting flange having means for mounting it onto existing wheel bolts of a vehicle axle on which the adapter is to be mounted;
   a hub including a sleeve rotatably mounted on said stub axle, and a wheel flange having means for mounting a wheel identical to the means for mounting on the mounting flange;
   selectively engagable and disengagable means for effecting a driving connection between said sleeve and said stub axle comprising a drive member having a central opening and being axially slidably mounted relative to both said stub axle and said sleeve, the interiors of the drive member being axially slidably and rotationally drivably engageable with said stub axle, said sleeve having drive surface means defined thereon, said drive member having radially outwardly extending drive means on the outer periphery thereof rotationally drivably engageable with the drive surface means, and slidable axially along said drive surface means, the drive member in at least one axial driving position being rotationally drivably engaged with both the stub axle and the sleeve;
   a washer mounted relative to the hub and retained from movement toward the mounting flange beyond a stopped position, said washer having spring mounting pegs extending from a side thereof facing toward the open end of the hub, said washer being mounted between the drive member and the mounting flange;

spring means having first ends mounted on said pegs and engaging the drive member for urging said drive member in an axial direction outwardly from the mounting flange, said spring means having second ends engaging the drive member and urging said drive member to a disengaged position wherein one of the rotationally drivable connections between the drive member and the stub axle and the drive member and the sleeve respectively, is disengaged; and means to control the position of said drive member to overcome the force of said spring means to move the drive member from the disengaged position to position to effect a driving connection from the stub axle to the drive member and thus to the hub sleeve when the drive member is moved axially to its driving position.

2. The apparatus of claim 1 wherein said interior surface of the opening of said drive member and the exterior surface of said stub axle have complimentary splines thereon.

3. The apparatus of claim 1 wherein said means to control the position of the drive member comprises a cap screw threaded into the end of said stub axle opposite from the mounting flange, said cap screw having a flange that engages surfaces of said drive member, said cap screw being threadable in axial direction to effect axial movement of said drive member between the driving position and the disengaged position.

4. The apparatus of claim 3 wherein said hub sleeve extends outwardly beyond the end of said stub axle, and snap ring means mounted on the interior of said hub sleeve to prevent said drive member from moving axially outward beyond the end of said hub sleeve.

5. The apparatus of claim 4 wherein said wheel flange of said hub has an aperture therein of size to permit a lug wrench to pass through the aperture to permit installing the mounting flange attached to the stub axle for connection to the existing wheel bolts of a driving axle.

* * * * *